Patented June 20, 1950

2,512,580

UNITED STATES PATENT OFFICE 2,512,580

SLOW-SETTING BITUMINOUS EMULSIONS

Paul E. McCoy, San Francisco, Calif., assignor, by mesne assignments, to Stancal Asphalt & Bitumuls Company, San Francisco, Calif., a corporation of Delaware No Drawing. Application June 14, 1948,
Serial No. 32,992

9 Claims. (Cl. 252—311.5)

The present invention relates to the preparation of slow-setting bituminous emulsions having water as the continuous phase and a water-insoluble, dispersible bituminous material, for instance, asphalt, as the dispersed phase. More particularly, the invention relates to such emulsions containing sulfonated tall oil, the films of which emulsions have unusual properties, such as superior adhesive and appearance characteristics, said emulsions being suitable for use in paving construction and the like.

Slow-setting or mixing type bituminous emulsions employed for coating finely graded or dusty aggregates are required to have certain properties, as described, for example, in A. S. T. M. Designation: D631-46, a most important property of such emulsions being stability against coalescence or premature breakdown in mixing with aggregate and when brought in contact with aggregate, stone or electrolytes. This stability in bituminous emulsions is rated by means of well-known tests, such as the cement mixing test and the demulsibility test, both described in A. S. T. M. Designation: D244-42. The cement mixing test has for its object the determination of the ability of the emulsion to mix with fine aggregate, such as Portland cement, without undue coagulation; in the demulsibility test, the emulsion is treated with a 0.1 N calcium chloride solution and the per cent breakdown noted. Slow-setting bituminous emulsions are usually required to give values of less than five per cent when subjected to the cement mixing test, and zero break-down when treated with a 0.1 N calcium chloride solution.

Slow-setting bituminous emulsions are commonly prepared by stabilizing so-called "quick-breaking" or primary emulsions by means of a variety of substances effective as protective colloids, such as starches, proteins, carbohydrates, lignin derivatives and the like. Quick-breaking emulsions may be prepared, for example, by means of the process described in Braun U. S. Patent No. 1,737,491 by adding molten bitumen and alkaline water to preformed emulsions. Another method of preparing the quick-breaking type emulsion is according to the teachings of Montgomerie U. S. Patent No. 1,643,675, by which melted asphalt is mixed directly with a hot, dilute alkali solution. The quick-breaking emulsions resulting from the foregoing processes may further be stabilized by the incorporation therein of a protective colloid in an amount between about 0.5 and 5 per cent of the emulsion and preferably between about 1 and 2 percentage. Stable emulsions have also been prepared by means of agents having the dual function of emulsification and stabilization. Such an emulsifying and stabilizing agent is the sulfonation product of the hydrocarbon-insoluble pine wood resin described in U. S. Patent No. 2,328,481.

Irrespective of the manner in which stable emulsions are prepared, it is well known that coatings deposited therefrom on aggregate surfaces present a dull, dusty brown, lifeless appearance. It is also known that such emulsions, while effective to coat fine aggregate, are unsatisfactory for coating coarser aggregate. Stable emulsions, when employed in treating coarse aggregate, cover the individual coarse particles, but the coated particles are incapable of binding together in a coherent whole. For this reason, stable emulsions are generally not employed in connection with coarse aggregate and are limited to treating fine aggregate. In treating coarse aggregate the so-called "medium-setting emulsions," as described, for example, in A. S. T. M. D397-39 (For Coarse Aggregate Plant Mixes), and A. S. T. M. D398-39 (For Retread and Coarse Aggregate Mixes) are in use. As the name implies, the medium-setting emulsion is not quite so stable as the full mixing type emulsions, and the specifications therefor, such as cement mixing qualities and demulsibility, are less stringent.

Attempts have been made to offset the dull film appearance of stable emulsions and to improve the adhesive characteristics thereof. For example, it has been attempted to achieve the aforesaid desired effects by the incorporation in stable emulsions of various additives, such as soaps, pine tar, pine oil, etc. Such attempts, although effective to a certain degree, have the disadvantage of impairing the mixing qualities of stable emulsions and causing phase separation.

An object of the present invention is to improve the appearance and adhesive characteristics of films laid from stable emulsions.

Another object of the invention is to improve the adhesive characteristics of films laid from stable emulsions.

A further object of the invention is to prepare a stable emulsion capable of being used with fine and coarse aggregate.

Other objects and advantages of the invention will be apparent from the following description of the invention.

In accordance with the present invention, it has been found that stable bituminous emulsions having sulfonated tall oil incorporated therein under certain specific conditions may be deposited on aggregate surfaces as a shiny, black and highly tacky film, capable of coating coarse and fine aggregate.

By the term "bituminous emulsions" it is meant to include bituminous substances which are normally solid, semi-solid or viscous liquids at ordinary atmospheric temperatures. A classification of suitable bituminous substances contemplated by the present invention appears in U. S. Patent No. 2,396,669. Examples of operative materials are bitumens, such as petroleum and native asphalts, native mineral waxes, asphaltites; pyrobitumens, such as asphaltic pyrobituminous shales, lignite, peat; pyrogeneous distillates, such as petroleum paraffin, peat paraffin, oil-gas tar, coal tar; pyrogeneous residues, such as blown petroleum asphalts, sludge asphalts, pressure tars, residual oils, oil-gas-tar pitch, wood pitch, etc. Of these materials petroleum asphalt is most advantageously used, and it may be produced by steam refining, by air-blowing, by solvent extraction methods or by a combination of such methods.

It has been found that the improved effect of films formed from the emulsions herein contemplated are peculiar to sulfonated tall oil as the film improving additive. As will hereinafter more fully appear, other sulfonated materials of mineral, animal and vegetable origin are incapable of producing the results obtained through the use of sulfonated tall oil.

The sulfonated tall oil products contemplated by the present invention are the sulfonation products of tall oils derived from the sulfate and sulfite process of treating wood pulp. In the preparation of tall oil, coniferous woods are digested, usually under pressure, by means of a solution of sodium hydroxide, sodium sulfide, and smaller proportions of sodium carbonate and sulfate. The resulting "black liquor" is evaporated and then treated with sodium sulfate to salt out the soap. The soap is separated and purified by washing with water and steam. The purified soap is then acidified while agitating with sulfuric acid of 30 to 50 per cent strength, following which the "tall oil" is run off from the aqueous solution while still hot. In general, the chemical constitution of tall oil comprises on the average: fatty acids, 45 to 55 per cent; rosin acids, 40 to 45 per cent; unsaponifiable matter, such as higher alcohols, sterols, etc., about 6 to 10 per cent. Tall oil has about the following specifications: iodine number, 150 to 180; saponification number, 160 to 170; acid number, 150 to 160; rosin acids number, 70 to 80; pour point, not in excess of about 45° F.; viscosity in Saybolt Universal seconds, 110 to 130; specific gravity, 0.96 to 0.98; flash point, 350 to 370° F.; and fire point, 410 to 430° F.

The preparation of the sulfonated material contemplated by the present invention may be effected by treating the tall oil hereinabove described according to methods and principles employed in the art of sulfonation to produce the commercial sulfonated tall oil product. For example, sulfonation may be accomplished by contacting tall oil with a suitable sulfonating agent, such as concentrated or fuming sulfuric acid, chlorosulfuric acid, sulfur trioxide, or acetyl sulfuric acid, at a temperature, such as about 10° C. to about 50° C., at which undesirable charring of the tall oil constituents and undesirable side reactions do not occur or are minimized while effecting substantially complete sulfonation of the sulfonatable constituents of the tall oil. Following the sulfonation reaction, the excess acidity is advantageously neutralized with a suitable base, such as an alkali metal or alkaline earth metal hydroxide or oxide, for example, caustic soda or lime, and the salt derivatives resulting from the neutralization of the sulfonated tall oil are also contemplated by the invention.

By the term "sulfonated tall oil," therefore, it is intended to embrace the acidic product resulting from the reaction of tall oil and sulfonating agent, as well as the salt derivatives of said product or mixtures of the two, whether the sulfonation reaction results in sulfonation or sulfation or both of the tall oil constituents or molecules.

In carrying out the invention, the sulfonated tall oil product is added to the bituminous emulsion after emulsification is substantially complete. Thus, the sulfonated tall oil may be added to a preformed stable emulsion after the addition of a stabilizing protective colloid as hereinabove described or simultaneously with the addition of the stabilizer or protective colloid to a preformed, quick-breaking or primary emulsion. Where the stable emulsion is prepared by means of an emulsifying and stabilizing agent, the sulfonated tall oil is added to the emulsion when the step of emulsification is substantially complete.

It has been found that the addition of the sulfonated tall oil product during the course of emulsification or prior to substantially complete emulsification or dispersion of the bituminous matter is unproductive of the results desired. For example, in my copending application filed simultaneously herewith, Serial No. 32,991, wherein I describe the use of sulfonated tall oil, as emulsifying agent in the preparation of non-alkaline, quick-breaking emulsions, I have found that stabilization of the resulting quick-breaking emulsion yields an emulsion lacking the desired adhesive and appearance characteristics possessed by the emulsions contemplated by the present invention. I have further found, however, that addition of more sulfonated tall oil during or after stabilization of the sulfonated tall oil emulsified bituminous substance will impart the superior characteristics of appearance and tackiness herein described.

I have found in the treatment of slow-setting bituminous emulsions with sulfonated tall oil that the alkalinity of the bituminous emulsions must be controlled. As will be appreciated by those skilled in the art, stable emulsions, particularly those that result from the stabilization of a primary emulsion as prepared in accordance with the above mentioned Braun and Montgomerie patents, have an aqueous phase of high alkalinity, the degree of alkalinity usually being in excess of pH 10. In such cases it is advantageous to treat the preformed emulsion with a weakly acid reacting material, such as acetic, boric or orthophosphoric acids, to reduce the alkalinity to a point not above about pH 8.5. Emulsions having a pH as low as 7 and even as low as 3 or as low as operating equipment can withstand the corrosive effects of an acid condition are suitable for purposes of the present invention. However, where the protective colloid may be adversely affected by too acidic a condition, for example, proteins which separate from the emulsion at a pH below the isoelectric point thereof or carbohydrates which hydrolyze at too low a pH, the lower limit of acidity will be governed by such critical points of acidity below which the stabilizer loses its effectiveness.

I have found that I may improve the film characteristics of stable bituminous emulsions by the incorporation therein during or after stabilization of the primary emulsion of about 1 to about 3 per cent by weight of sulfonated tall oil based on the emulsion. Ordinarily, the addition of an amount of about 1 to about 3 parts by weight of sulfonated tall oil to 100 parts of emulsion is sufficient to impart the desired appearance and tackiness to the coatings laid from the sulfonated tall oil treated bituminous emulsions. Additional sulfonated tall oil may, however, be incorporated into the emulsions, and the upper limit of the amount thereof is governed by the amount of stabilizer in the emulsion. In general, amounts by weight of sulfonated tall oil below about six-fold the amount of stabilizer present in the emulsion have been observed to give the desired results; amounts greater than a ratio of 6 parts sulfonated tall oil to 1 part of stabilizing agent adversely affect the mixing qualities of the emulsions and cause such emulsions to fail the cement mixing test above mentioned.

As specific illustrations of the practice of the invention, the following examples are given:

Example I

A quick-breaking asphalt emulsion was prepared by emulsifying 57 parts by weight of hot 50/60 penetration California asphalt in 43 parts by weight of hot 0.35 per cent aqueous caustic soda. To this quick-breaking emulsion there was added 1 part of dairy casein, the casein being added as a solution consisting of 15 per cent casein, 0.75 per cent caustic soda, and the remainder water. The resulting stable mixing emulsion was neutralized to a pH of 8.5 with boric acid and further neutralized to a pH of 7 with a 5 per cent hydrochloric acid solution. The emulsion was then divided into two equal portions and to one portion there was added to 100 parts by weight of the emulsion, 2.5 parts of sulfonated tall oil dispersed in an equal quantity of water, while the other portion received no admixture. Both portions of the emulsion passed the cement mixing test. Sand-blasted glass slides 1 inch by 3 inches were then dipped into the sulfonated tall oil treated emulsion, while other slides were dipped into the emulsion lacking the sulfonated tall oil. Examination of the coatings when dried showed the films deposited from the emulsion lacking sulfonated tall oil to be dull and non-tacky, whereas the films formed from the sulfonated tall oil treated emulsion were bright and tacky.

Separate lots of crushed stone were coated with the two emulsions. The usual lifeless appearing, non-sticky coating was obtained with the emulsion lacking sulfonated tall oil, while a glossy, sticky coating was obtained with the emulsion containing sulfonated tall oil.

Example II

A stable mixing type emulsion was prepared as in Example I, with the exception that 6 parts by weight of sulfonated tall oil was added to 100 parts of stable mixing emulsion. The sulfonated tall oil treated emulsion was then subjected to the cement mixing test, a value somewhat in excess of 5 per cent being obtained.

Since the amount of sulfonated tall oil (6 parts) was about six-fold the amount of protective colloid (1 part casein) employed in effecting the stable emulsion, the resulting emulsion was relatively unstable and therefore incapable of passing the cement mixing test.

Example III

A quick-breaking emulsion as first made by melting 50/60 penetration asphalt and dispersing the asphalt in hot water containing caustic soda. To the resulting emulsion there was added the pine wood resin described in Buckley U. S. Patent No. 2,256,886. The resultant emulsion having a pH of about 10.5 consisted of 55 per cent asphalt, 0.15 per cent sodium hydroxide, 43.35 per cent water and 1.50 per cent of the aforesaid resin. Three separate portions of the emulsion were treated to contain varying amounts of 1, 2 and 3 per cent sulfonated tall oil. The three emulsions failed to pass the cement mixing test, indicating that the alkalinity of the emulsions was too high, and consequently caused the production of an unstable emulsion upon incorporation therein of sulfonated tall oil.

Example IV

A quick-breaking emulsion was prepared in accordance with my copending application, Serial No. 32,991; that is, hot molten asphalt of 50/60 penetration and an aqueous dispersion of sulfonated tall oil were charged in separate streams to a colloid mill. To the resulting emulsion there was added a small amount of anti-settlement agent, sodium carboxy methyl cellulose. The final composition of the emulsion was asphalt, 56 per cent; sulfonated tall oil, 3 per cent; water, 40.9 per cent; and anti-settlement agent, 0.1 per cent. The quick-breaking emulsion was then stabilized by the addition thereto of 1 per cent casein, as described in Example I, to give a stable mixing type emulsion. Into a portion of this emulsion there was then incorporated an additional 3 per cent of sulfonated tall oil dispersed in an equal quantity of water. The portion containing additional sulfonated tall oil and the untreated portion were then subjected to the gloss test described in A. S. T. M. Designation D523T-44. Iron panels (26 gauge), 2-3 inches by 9 inches, were dipped ¾ of their length in the two emulsions described above. The panels were removed and hung for 24 hours at laboratory temperature (70-75° F.) and humidity (relative humidity, 40-60 per cent). The panels were then placed under a previously standardized glossmeter and their 60° specular gloss determined. The panels, coated with the emulsion containing additional sulfonated tall oil incorporated in the stabilized sulfonated tall oil emulsified quick-breaking emulsion, gave a value averaging 40 points gloss per mil., whereas the similarly prepared stabilized emulsion, to which no additional sulfonated tall oil had been added, gave glossmeter readings averaging 26 points gloss per mil.

In the absence of a common test for the evaluation of the adhesive or stickiness qualities of films laid from the emulsions herein contemplated, a test was devised as follows:

The emulsions to be tested for stickiness were applied to the surface of sheets of sand-blasted plate glass with a film applicator to a uniform film thickness of 0.010 inch, following which the films were cured 72 hours in air at room temperature. Then 200 g. brass weights were placed on each film and the glass plate heated slightly to settle the weights firmly to the glass, leaving a very thin film between surfaces. After cooling to room temperature, the plate glass was raised to an angle of approximately 15° with the vertical, and the weights allowed to slide down the glass. Observations were made on differences in the rate of sliding, that is, the length traveled by the weights in a given time.

A stable mixing emulsion was made up according to Watts and McCoy Patent No. 2,332,542. In following the teaching of the aforesaid patent, a primary quick-breaking penetration type emulsion was first prepared by means of molten 180-200 penetration asphalt and alkaline water as described in U. S. patent to Montgomerie, wherein the emulsifying agent consists of the reaction products of alkaline water and naturally occurring asphaltogenic acids in the asphalt. About 0.47 per cent by weight of the final emulsion of tetrasodium pyrophosphate was dissolved in water to which there was added an amount of about 1.20 per cent of the final emulsion of calcium-containing waste sulfite liquor. In the water used to dissolve the waste sulfite liquor there was added boric acid to bring the pH to about 8.5, followed by the addition of sufficient 5 per cent HCl solution to bring the pH of the final emulsion to a pH of about 6.5

To separate portions of the emulsion there was then added 6 per cent of various sulfonated oils, that is, sulfonated tall oil, sulfonated castor oil, sulfonated neat's-foot oil, sulfonated whale oil and sulfonated mineral oil. The sulfonated oil treated emulsions were applied to plate glass slides to a film thickness of 0.010 inch by means of a film applicator. The coated slides were then treated as described in the stickness test above, and the coatings compared for stickness by determining the length in inches travelled by the 200 g. weights in 29 minutes and 15 seconds. The results are tabulated below:

| Type of Sulfonated Oil in the Emulsion | Length in Inches Traveled by 200 g. Weights in 29 Minutes, 15 Seconds |
|---|---|
| Sulfonated tall oil | ¼ |
| Sulfonated castor oil | 3 |
| Sulfonated neat's-foot oil | 4 |
| Sulfonated whale oil | 2 |
| Sulfonated mineral oil | 4 |

From the above data it may be seen that of all the sulfonated oils used, sulfonated tall oil gives far superior results. The length travelled by the 200 g. weight over the film laid from the emulsion containing sulfonated tall oil was only ¼ inch, while the next best effect of 2 inches travelled by the 200 g. weight over the emulsion film occurred in the case of the emulsion containing sulfonated whale oil. In the other cases, wherein emulsions contained a sulfonated vegetable oil (sulfonated castor oil), a sulfonated animal oil (sulfonated neat's-foot oil), and a sulfonated mineral oil, the results were even less desirable.

The data therefore indicate that the presence of sulfonated tall oil in stable mixing emulsions imparts better stickiness and less lubrication to films laid therefrom as compared with other sulfonated oils, as a result of which the sulfonated tall oil treated emulsions are characterized by greater stability and less sliding action within a material, such as asphalt pavement composed of rock chips bound together by thin films of asphalt.

Obviously, many modifications and variations of the invention as hereinabove set forth may be made without departing from the spirit and scope thereof, and therefore only such limitations are to be imposed as are indicated in the appended claims.

I claim:

1. A slow-setting bituminous emulsion capable of passing A. S. T. M. D631-46 specifications comprising water as the continuous phase, a bituminous substance emulsified therein as the dispersed phase, a stabilizing agent to maintain said bituminous substance dispersed in the continuous phase, and a small amount, sufficient to impart substantially improved adhesion and appearance characteristics to said slow-setting bituminous emulsion, of sulfonated tall oil, said sulfonated tall oil having been added at a pH below about 8.5 and after emulsification of the bituminous substance dispersed phase in the water continuous phase.

2. A slow-setting bituminous emulsion substantially as described in claim 1, in which the bituminous substance is asphalt.

3. A slow-setting bituminous emulsion substantially as described in claim 1, wherein the sulfonated tall oil is added in an amount below about six-fold the amount of stabilizing agent and sufficient to impart substantially improved appearance and adhesive characteristics to said slow-setting bituminous emulsion.

4. A slow-setting bituminous emulsion substantially as described in claim 3, wherein the bituminous substance is asphalt.

5. A slow-setting bituminous emulsion substantially as described in claim 3, wherein the sulfonated tall oil is present in an amount between about 1 and 3 per cent based on the emulsion and less than about six-fold the amount of stabilizing agent.

6. The process of improving the appearance and adhesive characteristics of slow-setting bituminous emulsions containing a stabilizing agent, which comprises adding thereto, at a pH below about 8.5, an amount of sulfonated tall oil sufficient to produce an emulsion capable of laying films of materially improved appearance and adhesive characteristics.

7. The process of preparing a slow-setting mixing type bituminous emulsion, which comprises first forming a primary quick-breaking bituminous emulsion having a pH below about 8.5, then stabilizing the resulting emulsion to render the emulsion slow-setting, and adding sulfonated tall oil in an amount sufficient to impart improved adhesive and appearance characteristics to films laid from the emulsion.

8. The process substantially as described in claim 7, wherein the bituminous emulsion is an asphalt emulsion.

9. The process of preparing a slow-setting mixing type bituminous emulsion, which comprises forming a primary quick-breaking bituminous emulsion, adjusting the pH of said emulsion below a pH of about 8.5, adding a stabilizing agent to the resulting emulsion to render the emulsion slow-setting, and incorporating in said slow-setting emulsion an amount of about 1 to about 3 per cent by weight based on the emulsion of sulfonated tall oil but less than six-fold the amount of stabilizing agent to improve the appearance and adhesive characteristics of films laid from said slow-setting bituminous emulsion.

PAUL E. McCOY.

REFERENCES CITED

The following references are of record in the file of this patent:

UNITED STATES PATENTS

| Number | Name | Date |
|---|---|---|
| 263,307 | Thompson et al. | Dec. 30, 1926 |
| 1,888,295 | Smith | Nov. 22, 1932 |
| 2,190,604 | Montgomerie et al. | Feb. 13, 1940 |
| 2,332,542 | Watts et al. | July 31, 1940 |

FOREIGN PATENTS

| Number | Country | Date |
|---|---|---|
| 310,541 | Germany | Jan. 30, 1919 |
| 314,017 | Germany | July 29, 1919 |